(12) United States Patent
Minami et al.

(10) Patent No.: US 6,849,209 B2
(45) Date of Patent: Feb. 1, 2005

(54) ARTICLE HAVING PREDETERMINED SURFACE SHAPE AND METHOD FOR PRODUCTION THEREOF

(75) Inventors: Tsutomu Minami, 7-1, Oonodai 2-chome, Osakasayama-shi, Osaka 589-0023 (JP); Masahiro Tatsumisago, Sakai (JP); Kiyoharu Tadanaga, Sakai (JP); Atsunori Matsuda, Kawachinagano (JP); Masahiro Hori, Osaka (JP); Koichiro Nakamura, Osaka (JP); Hiroaki Yamamoto, Osaka (JP)

(73) Assignees: Nippon Sheet Glass Co., Ltd., Osaka (JP); Tsutomu Minami, Osaka (JP)

( * ) Notice: Subject to any disclaimer, the term of this patent is extended or adjusted under 35 U.S.C. 154(b) by 0 days.

(21) Appl. No.: 09/959,451

(22) PCT Filed: Feb. 21, 2001

(86) PCT No.: PCT/JP01/01255

§ 371 (c)(1),
(2), (4) Date: Oct. 25, 2001

(87) PCT Pub. No.: WO01/62494

PCT Pub. Date: Aug. 30, 2001

(65) Prior Publication Data

US 2002/0160153 A1 Oct. 31, 2002

(30) Foreign Application Priority Data

Feb. 25, 2000 (JP) ........................................ 2000-049387

(51) Int. Cl.[7] .............................. B29D 7/00; B32B 3/30
(52) U.S. Cl. .................... 264/1.34; 264/1.24; 264/1.32; 428/447; 528/43
(58) Field of Search ......................... 428/447; 528/43; 264/1.24, 1.32, 1.34, 1.21, 1.7; 427/355, 356

(56) References Cited

U.S. PATENT DOCUMENTS 4,026,720 A    5/1977  Ikeda
4,299,886 A    11/1981 Soejima et al.
5,766,680 A  * 6/1998  Schmidt et al. ............. 427/226
6,361,718 B1 * 3/2002  Shinmo et al. ............ 264/1.21
6,403,183 B1 * 6/2002  Iwamiya et al.

FOREIGN PATENT DOCUMENTS

| EP | 0 985 510 | | 3/2000 |
|----|-----------|---|--------|
| JP | 62-225273 | | 10/1987 |
| JP | 2-036282 | | 2/1990 |
| JP | 3-221577 | | 9/1991 |
| JP | 06056998 A | * | 3/1994 |
| JP | 6-114334 | | 4/1994 |
| JP | 11-314927 | | 11/1999 |
| WO | WO-982315 A1 | * | 6/1998 |
| WO | WO-9826315 A1 | | 6/1998 |
| WO | 99/39890 | | 8/1999 |

* cited by examiner

*Primary Examiner*—Margaret G. Moore
*Assistant Examiner*—Marc S Zimmer
(74) *Attorney, Agent, or Firm*—Wenderoth, Lind & Ponack, L.L.P.

(57) ABSTRACT

An article with a predetermined surface pattern that is coated with a film which makes possible the complete transfer of the pattern of a patterning die and thick-film patterning having a depth to the order of several tens of micrometers, prevents the occurrence of cracks, has high film hardness, and has a surface pattern which is the inverse of the surface pattern of the patterning die. This article is produced by joining a patterning die closely to a substrate with a sol-gel material containing the silane compound represented by the formula: $R^1SiX_3$ (wherein $R^1$ is an alkyl group or hydrogen and X is an alkoxyl group or a halogen atom) and the silane compound represented by the formula: $R^2SiY_3$ (wherein $R^2$ is an aryl group or a substituted aryl group and Y is an alkoxyl group or a halogen atom) disposed therebetween in the form of a film and heating them to coat the surface of the substrate with a gel film having a surface pattern which is the inverse of the surface pattern of the patterning die.

12 Claims, No Drawings

ARTICLE HAVING PREDETERMINED SURFACE SHAPE AND METHOD FOR PRODUCTION THEREOF

This application is a 371 application of PCT/JP01/01255, filed Feb. 21, 2001.

TECHNICAL FIELD

The present invention relates to an article coated with an inorganic-organic composite film and having a predetermined surface pattern, particularly a micro-optical element such as a microlens array or an optical waveguide, and production method thereof.

BACKGROUND ART

As a conventional substrate with fine projections and depressions, a substrate with fine projections and depressions which is obtained by coating a glass substrate with a solution containing tetraethoxysilane and polyethylene glycol by a sol-gel process and pressing a die against the coated glass substrate to transfer a pattern of projections and depressions to the coating film is reported in Japanese Patent Laid-Open Publication No. 62-225273. Further, a substrate with fine projections and depressions which is obtained by coating a glass substrate with a solution containing an organoalkoxysilane such as methyltriethoxysilane and pressing a die against the coated glass substrate to transfer a pattern of projections and depressions to the coating film is reported in Japanese Patent Laid-Open Publication No. 6-114334. Still further, a substrate with fine projections and depressions which is obtained by pressing a die against a composite comprising compounds obtained by hydrolyzing and polycondensing dimethylalkoxysilane and phenyltrialkoxysilane to transfer a pattern of projections and depressions to the composite is reported in Japanese Patent Laid-Open Publication No. 11-314927.

However, although the substrate with fine projections and depressions which is prepared by using the solution containing tetraethoxysilane and polyethylene glycol has the characteristic that the film becomes completely inorganic and amorphous when the substrate is calcined at about 350° C., the substrate also has the problems that the inverse of the pattern of the die cannot be transferred completely due to the shrinkage of the film by the calcination and that cracks are produced by the shrinkage stress of the film when the thickness of the film is 1 μm or larger. Meanwhile, the substrate with fine projections and depressions which is prepared by using the solution containing an organoalkoxysilane such as methyltriethoxysilane has such an excellent characteristic that the inverse of the pattern of the die can be transferred completely and the film can be thickened since the film has low shrinkage, it is difficult to control the refractive index of the film actively. In addition, although the substrate with a pattern of fine projections and depressions which is transferred to the substrate by pressing the die against the composite comprising the compounds obtained by hydrolyzing and polycondensing dimethylalkoxysilane and phenyltrialkoxysilane has excellent heat resistance and a thick-film pattern can be formed easily, it also has such a problem that the film has low film hardness.

DISCLOSURE OF THE INVENTION

It is an object of the present invention to provide an article with a predetermined surface pattern that is coated with a film which makes possible the complete transfer of the pattern of a patterning die and thick-film patterning having a depth to the order of several tens of micrometers, prevents the occurrence of cracks, has high film hardness and a controllable film refractive index, and has a surface pattern which is the inverse of the surface pattern of the patterning die.

It is another object of the present invention to provide a practical and industrially advantageous method for producing the above article of the present invention.

It is still another object of the present invention to provide a mixed composition which is suitable for producing the above article of the present invention.

Other objects and advantages of the present invention will be apparent from the following description.

According to the present invention, firstly, the above objects and advantages of the present invention are achieved by a method for producing an article having a predetermined surface pattern, which comprises the steps of disposing closely a sol-gel material between a patterning die and a substrate in the form of a film and heating them to coat the surface of the substrate with a gel film having a surface pattern which is the inverse of the surface pattern of the patterning die, wherein the sol-gel material contains:

(A) at least one compound selected from the group consisting of the silane compound represented by the following formula (1), the hydrolysate of the silane compound, and the polycondensate of the hydrolysate:

$$R^1SiX_3 \quad (1)$$

wherein $R^1$ is an alkyl group or a hydrogen atom, and X is an alkoxyl group or a halogen atom, and (B) at least one compound selected from the group consisting of the silane compound represented by the following formula (2), the hydrolysate of the silane compound, and the polycondensate of the hydrolysate:

$$R^2SiY_3 \quad (2)$$

wherein $R^2$ is an aryl group or a substituted aryl group, and Y is an alkoxyl group or a halogen atom.

Further, according to the present invention, secondly, the above objects and advantages of the present invention are achieved by an article with a predetermined surface pattern which comprises a substrate and an organopolysiloxane film formed on the surface of the substrate, wherein the organopolysiloxane film contains the alkylsiloxane or hydrogensiloxane represented by the following formula (3):

$$R^3SiO_{3/2} \quad (3)$$

wherein $R^3$ is an alkyl group or hydrogen, and the arylsiloxane or substituted arylsiloxane represented by the following formula (4):

$$R^4SiO_{3/2} \quad (4)$$

wherein $R^4$ is an aryl group or a substituted aryl group.

Further, according to the present invention, thirdly, the above objects and advantages of the present invention are achieved by a film-forming mixed composition for producing an article having a predetermined surface pattern, which contains:

(A) 1 mole of at least one compound selected from the group consisting of the silane compound represented by the following formula (5), the hydrolysate of the silane compound, and the polycondensate of the hydrolysate:

$$R^1SiX_3 \quad (5)$$

wherein R¹ is an alkyl group or a hydrogen atom, and X is an alkoxyl group or a halogen atom, (B) 1.0 to 19 moles of at least one compound selected from the group consisting of the silane compound represented by the following formula (6), the hydrolysate of the silane compound, and the polycondensate of the hydrolysate:

$$R^2SiY_3 \tag{6}$$

wherein R² is an aryl group or a substituted aryl group, and Y is an alkoxyl group or a halogen atom, (C) an alcohol in an amount of 0.3 to 3 times as many moles as the total of the components (A) and (B), (D) an acid catalyst in an amount of 0.00001 to 0.1 times as many moles as the total of the components (A) and (B), and (E) water in an amount of 2 to 20 times as many moles as the total of the components (A) and (B).

A description will be given to the present invention hereinafter. The description will be started with the production method of the present invention and others will be described in order thereafter.

In the present invention, the sol-gel material contains both the silane compound (to be referred to as "component (A)" hereinafter) represented by the above formula (1) and the silane compound (to be referred to as "component (B)" hereinafter) represented by the above formula (2).

In the above formula (1), R¹ is an alkyl group or a hydrogen atom, and X is an alkoxyl group or a halogen atom. The alkyl group represented by R¹ may be linear or branched and is preferably an alkyl group having 1 to 3 carbon atoms. R¹ is particularly preferably a methyl group, an ethyl group or a hydrogen atom. Further, the alkoxyl group represented by X may be linear or branched and is preferably an alkoxyl group having 1 to 4 carbon atoms. The halogen atom represented by X may be fluorine, chlorine or bromine, for example. X is particularly preferably an alkoxyl group having 1 to 3 carbon atoms or a chlorine atom.

Illustrative examples of the component (A) include methyltrimethoxysilane, methyltriethoxysilane, methyltripropoxysilane, methyltributoxysilane, methyltrichlorosilane, ethyltrimethoxysilane, ethyltriethoxysilane, ethyltripropoxysilane, ethyltributoxysilane, ethyltrichlorosilane, propyltrimethoxysilane, propyltriethoxysilane, propyltrichlorosilane, hydrogentrimethoxysilane, hydrogentriethoxysilane and hydrogentrichlorosilane. Of these, methyltriethoxysilane is preferred. In addition to these, the component (A) may be their hydrolysates or condensates having a condensation degree of 2 to 10. When the above condensate is used, the content of the component (A) is converted into those of monomers.

In the silane compound (component (B)) represented by the above formula (2), R² is a substituted or unsubstituted aryl group, and Y is an alkoxyl group or a halogen atom. The unsubstituted aryl group is preferably an aryl group having 6 to 13 carbon atoms, such as phenyl, biphenyl, naphthyl or benzyl. Further, the substituent of the aryl group is preferably an alkyl group having 1 to 3 carbon toms or a halogen atom, for example. The aryl groups substituted by such substituents are preferably a tolyl group, a xylyl group and a chlorophenyl group, for example. R² is particularly preferably a phenyl group or a benzyl group. Further, examples of the alkoxyl group and halogen atom represented by Y are the same as those exemplified for the X in the formula (1).

Illustrative examples of the component (B) include organotrialkoxysilanes such as phenyltrimethoxysilane, phenyltriethoxysilane, phenyltri-n-butoxysilane, benzyltrimethoxysilane, benzyltriethoxysilane and benzyltri-n-butoxysilane, and benzyltrichlorosilanes and phenyltrichlorosilane. Of these, phenyltriethoxysilane or substituted phenyltriethoxysilane is preferred. In addition to these, the component (B) may be their hydrolysates or condensates having a condensation degree of 2 to 10. When the above condensate is used, the content of the component (A) is converted into those of monomers.

The sol-gel material preferably contains 5 to 50 mol % of the component (A) and 50 to 95 mol % of the component (B) based on the total of the components (A) and (B). More preferably, the sol-gel material contains 20 to 40 mol % of the component (A) and 60 to 80 mol % of the component (B). By mixing the components together in the above ratios, flexibility is imparted to the obtained film. Therefore, a film having a thickness of not smaller than 10 μm is hardly cracked when subjected to final heat treatment at about 200° C. or cooled after the final heat treatment and has high film hardness.

The sol-gel material in the present invention preferably contains water, a catalyst and a solvent for controlling viscosity which are necessary for hydrolysis as required in addition to the above components (A) and (B). The above water and catalyst are not always necessary when the hydrolysate or the polycondensate of the hydrolysate are used as the components (A) and (B).

As the catalyst, an acid catalyst is preferably used. As the acid catalyst, it is preferable to use at least one acid catalyst selected from, for example, formic acid, acetic acid, tetrafluoroacetic acid, propionic acid, oxalic acid, hydrochloric acid, nitric acid and sulfuric acid in the form of an aqueous solution. The amount of an acid catalyst to be added varies depending on the type of the acid and the strength (weak acid or strong acid) as a protonic acid. When the amount of the acid catalyst is too small, a hydrolysis and dehydrating condensation reaction proceeds slowly, while when the amount is too large, the condensation reaction proceeds excessively and the molecular weight becomes too large, whereby the coating solution is liable to have a precipitation or be gelled disadvantageously. Of these acid catalysts, an organic acid which is a weak acid is preferably used. Of the organic acids, formic acid is particularly preferably used since it has a small molecular weight and is easily evaporated. The amount of the acid catalyst, for example, when formic acid is used as the acid catalyst, is expressed, in a molar ratio, to be preferably 0.5 to 5 millimoles, more preferably 0.7 to 2 millimoles, when the total of the components (A) and (B) is 1 mole.

Further, water is preferably added at least in a stoichiometric ratio required for hydrolysis. This is because when the amount of water to be added is smaller than the stoichiometric ratio, the unreacted portions of the silane compounds (A) and (B) are liable to evaporate at the time of heat treatment for gelation. The amount of water, including that contained in a catalyst aqueous solution, is preferably 1.1 to 30 times larger than the required stoichiometric ratio, and in terms of molar ratio, it is preferably 2 to 20 times, more preferably 2 to 5 times larger than the total of the components (A) and (B). In addition, when the article having a predetermined surface pattern of the present invention, for example, an optical element, is used in proximity to memory chips and other electronic circuits, the useful lives of these electronic circuits may be shortened if chlorine is contained in the optical element. Therefore, an acid catalyst containing no chlorine is preferably used as the above acid catalyst.

Illustrative examples of the dilution solvent include alcohols such as methanol, ethanol, butanol, ethylene glycol and ethylene glycol-mono-n-propyl ether; aliphatic and alicyclic hydrocarbons such as n-hexane, n-octane, cyclohexane, cyclopentane and cyclooctane; aromatic hydrocarbons such as toluene, xylene and ethyl benzene; esters such as ethyl formate, ethyl acetate, n-butyl acetate, ethylene glycol monomethyl ether acetate, ethylene glycol monoethyl ether acetate and ethylene glycol monobutyl ether acetate; ketones such as acetone, methyl ethyl ketone, methyl isobutyl ketone and cyclohexanone; ethers such as dimethoxyethane, tetrahydrofuran, dioxane and diisopropyl ether; chlorinated hydrocarbons such as chloroform, methylene chloride, carbon tetrachloride and tetrachloroethane; and aprotic polar solvents such as N-methylpyrrolidone, dimethylformamide, dimethylacetoamide and ethylene carbonate.

An example of the preferable composition of the sol-gel material in the present invention is the following composition, that is, (A) 1 mole of the compound represented by the above formula (1),
(B) 1.0 to 19 moles of the compound represented by the following formula (2),
(C) an alcohol in an amount of 0.3 to 3 times as many moles as the total of the components (A) and (B),
(D) an acid catalyst in an amount of 0.00001 to 0.1 times as many moles as the total of the components (A) and (B), and (E) water in an amount of 2 to 20 times as many moles as the total of the components (A) and (B).

In the present invention, the sol-gel material is prepared by keeping a solution comprising the components (A) and (B), the alcohol solvent, water and the catalyst, which are the raw materials of the sol-gel material, for example, at room temperature for 30 to 120 minutes under agitation to hydrolyze these components.

Thereafter, it is preferable to evaporate the solvent and water contained in the solution and the alcohol and water which are the products from the dehydration and polycondensation reaction of the above sol-gel material while the sol-gel material is kept at normal pressure or under reduced pressure at temperatures ranging from room temperature to 140° C., more preferably from 70 to 100° C., for 6 to 30 hours to allow the dehydration and polycondensation reaction to proceed. As a result, the weight and volume of the solution or coating film are decreased to 25 to 35% by weight or volume of the original weight or volume at the time of preparation. Thereby, the shrinkage of the formed film is suppressed as much as possible, whereby the occurrence of cracks on the film can be prevented and the cured film can be formed without the occurrence of air bubbles in the film during final heat treatment. In the case of the solution, when this dehydration and polycondensation reaction proceeds excessively, the viscosity of the solution becomes so high that it is difficult to coat the solution on the surface of the patterning die or substrate. On the other hand, when the dehydration and polycondensation reaction does not proceed sufficiently, the occurrence of air bubbles in the film during final heat treatment cannot be prevented. It is preferable to control the proceeding of the dehydration and polycondensation reaction by selecting the temperature and retention time such that the viscosity of the solution would be not higher than $10^3$ poises.

The dehydration and polycondensation reaction may be allowed to proceed in the solution not only before the solution is coated as described above but also after it is coated on a substrate or patterning die.

As the above method of coating the solution, for example, casting, dipping, spin coating, spray coating, printing, flow coating, a combination of these and other known coating techniques can be employed as appropriate. The thickness of the film can be controlled by varying the pull-up speed in the dipping method or the rotational speed of a substrate in the spin coating method and by changing the concentration of the coating solution.

Representative examples of the process for producing an article, such as an optical element, which is coated with a gel film having a surface pattern which is the inverse of the surface pattern of a patterning die by disposing closely the above sol-gel material between a patterning die and a substrate in the form of a film and heating them are the following two processes.

A first process (to be referred to as "pour-into-die" process hereinafter) is a process comprising the steps of pouring the sol-gel material solution into a patterning die, heating them, bringing the substrate of an article into contact with the heated sol-gel material solution, further heating them to join the substrate and the formed film together, and subjecting the substrate and the formed film to final heat treatment after the die is removed. That is, with a patterning die having a pattern of fine projections and depressions held horizontal, a sol-gel material solution having a viscosity of not higher than $10^3$ poises is poured onto the patterning die to fill in the depressions of the patterning die with the sol-gel material. Instead of pouring the sol-gel material onto the patterning die, the patterning die may be immersed in a bath containing the sol-gel material or the sol-gel material solution may be applied to the surface of the patterning die with a brush. In that state, the patterning die is kept at temperatures ranging from room temperature to 180° C. for 20 to 120 minutes to allow the dehydration and polycondensation reaction to proceed until the viscosity of the sol-gel material filled in the depressions of the patterning die becomes $10^4$ to $10^8$ poises.

Then, a substrate is brought into intimate contact with the patterning die, and the sol-gel material is brought into contact with the surface of the substrate such that no voids are formed therebetween. In that state, they are further kept at temperatures ranging from room temperature to 180° C. for 10 to 120 minutes to allow the dehydration and polycondensation reaction of the sol-gel material to be almost completed and the sol-gel material to be gelled. Thereafter, by releasing the patterning die, a polysiloxane film which is a soft gel film having a surface pattern which is the inverse of the pattern of projections and depressions of the patterning die is formed in intimate contact with the surface of the substrate. When the patterning die is released too early, the polysiloxane film is so soft that the pattern of projections and depressions on its surface is deformed by its own weight. Thus, the above heat treatment is carried out until this deformation does not occur.

Thereafter, the substrate with the polysiloxane film is eventually heated at 50 to 350° C. for 10 to 150 minutes, thereby polycondensing the residual silanol groups of the polysiloxane film and evaporating the water produced by the polycondensation. As a result, the volume of the film is slightly decreased in the film thickness direction, whereby the film becomes a compact film. Thus, an optical element or other article which is coated with a film having a surface pattern which is the inverse of the surface pattern of a patterning die can be obtained.

A second patterning process (to be referred to as "pour-onto-substrate" process hereinafter) is a process comprising the steps of pouring a sol-gel material solution onto the surface of a substrate directly, heating them, pressing a patterning die against the film on the surface of the substrate when the liquid film acquires plasticity (or when the viscosity of the liquid becomes $10^4$ to $10^8$ poises), heating them in that state, releasing the patterning die after the completion of pattern transfer, and then subjecting the substrate and the formed film to final heat treatment. That is, with the surface to be coated of a substrate held horizontal, a sol-gel material solution having a viscosity of not higher than $10^3$ poises is poured onto the substrate and spread over the substrate in the form of a film so as to obtain a predetermined thickness. In that state, the substrate is kept at temperatures ranging from room temperature to 180° C. for 5 to 120 minutes at normal pressure or under reduced pressure to allow the dehydration and polycondensation reaction to proceed until the viscosity of the poured sol-gel material becomes $10^4$ to $10^8$ poises. Then, a patterning die having a pattern of fine projections and depressions is pressed against the sol-gel film on the surface of the substrate and held at a pressure of 0.5 to 120 kg/cm$^2$ at room temperature to 350° C. for 60 seconds to 60 minutes to allow the dehydration and polycondensation reaction of the sol-gel material to be almost completed and the sol-gel material to be gelled. Thereafter, by pilling off the patterning die, a polysiloxane film which is a gel film having a surface pattern which is the inverse of the pattern of projections and depressions of the patterning die is formed in intimate contact with the surface of the substrate. When the resulting substrate is further subjected to final heat treatment, for example, at 50 to 350° C. for 10 to 150 minutes as required, the residual silanol groups of the polysiloxane film are polycondensed and the water produced by the polycondensation is evaporated. As a result, the volume of the film is slightly decreased in the thickness direction, whereby the film becomes a compact film. Thus, an optical element such as a microlens, diffraction grating, optical waveguide or prism or other article which is coated with a film having a surface pattern which is the inverse of the surface pattern of a patterning die can be obtained.

The above patterning die is prepared in the following manner. For example, the flat surface of a glass substrate is etched precisely to form, for example, a concave die having a target shape. Using this as a master die, a convex metal matrix can be prepared by electroless plating or electrolytic plating. Alternatively, a convex metal master die is prepared by the above plating method using the above concave die as a matrix, and a concave metal matrix can be prepared by the above plating method using the above master die. These convex matrix and concave matrix can be used as the patterning die. In the above plating method, such metals as nickel and chromium are preferably used. In addition, a resin matrix is prepared from an ultraviolet-curable resin by a 2P molding method using the master die prepared by the above method, and this can be used as the patterning die.

To prepare the article having a predetermined surface pattern of the present invention, i.e., a substrate having fine projections and depressions, an arbitrary pattern of fine projections and depressions can be formed on any substrate. When it is used as a flat-plate microlens array, it is preferable to select glass as a substrate material. Illustrative examples of the glass substrate include quartz glass, soda lime glass, alkali aminosilicate glass, alkali borosilicate glass, multicomponent no-alkali glass and low-expansion crystallized glass. Further, to gather light efficiently, the fine projections and depressions of the substrate are preferably formed by arranging spherical or aspheric lenses.

The organopolysiloxane constituting this film contains 5 to 50 mol %, preferably 20 to 40 mol %, of the alkylsiloxane or hydrogensiloxane represented by the above formula (3) and 50 to 95 mol %, preferably 60 to 80 mol %, of the arylsiloxane (or substituted arylsiloxane) represented by the above formula (4). However, these values in mol % are based on the total of the two components which is taken as 100%. Further, the organopolysiloxane constituting this film also contains alkyl groups (such as a methyl group) in an amount of preferably 0.6 to 7.6% by weight, more preferably 2.5 to 5.7% by weight and aryl groups or substituted aryl groups (such as a phenyl group or substituted phenyl group) in an amount of preferably 39 to 58% by weight, more preferably 44 to 53% by weight. The thickness (film thickness) of this organopolysiloxane film, which is defined as the distance from the apex of the projection to the substrate, can be set freely as long as no cracks occur and can be set to be 0.5 to 200 µm, for example.

The thick film of the present invention which contains the above components (A) and (B) and has fine projections and depressions has small shrinkage and film stress caused by calcination. Thereby, the complete transfer of a die pattern and thick-film patterning having a depth to the order of several tens of micrometers are made possible. Further, by controlling the ratio of the above component (A) and the above component (B), the prevention of occurrence of cracks on the film and an improvement in the hardness of the film are made possible. While the film becomes compact and the hardness of the film is increased as the heat treatment temperature of the film is increased, the film is liable to be cracked. When the heat treatment is conducted at 100° C. for 30 minutes, no cracks occur if the film has a thickness of not larger than 100 µm and contains the alkylsiloxane (or hydrogensiloxane) in an amount of 5 to 50 mol % (and the arylsiloxane (or substituted arylsiloxane) in an amount of 50 to 95 mol %). Further, when the heat treatment is conducted at 200° C. for 30 minutes, no cracks occur if the film has a thickness of 5 to 20 µm and contains the alkylsiloxane (or hydrogensiloxane) in an amount of 20 to 50 mol % (and the arylsiloxane (or substituted arylsiloxane) in an amount of 50 to 80 mol %). In addition, when the heat treatment is conducted at 300° C. for 30 minutes, no cracks occur if the film has a thickness of not larger than 20 µm and contains the alkylsiloxane (or hydrogensiloxane) in an amount of 20 to 40 mol % (and the arylsiloxane (or substituted arylsiloxane) in an amount of 6 to 80 mol %). Further, this heat treatment or the drying treatment conducted prior to the heat treatment is conducted at a relative humidity of preferably not higher than 40%, more preferably not higher than 25%, in order to prevent the film from becoming opaque. It is assumed that the film becomes opaque because the solvent and water remain in the film as air bubbles when they evaporate from the film. Further, a polyorganosiloxane containing the monoalkylsiloxane (or monohydrogensiloxane) represented by the above formula (3) has a lower refractive index than a polyorganosiloxane containing the phenylsiloxane (or substituted phenylsiloxane) represented by the above formula (4). Therefore, by controlling the ratio of the contents of these polyorganosiloxanes, the refractive index of the film can be adjusted to be a desired value.

The present invention will be described in more detail with reference to Examples hereinafter.

EXAMPLE 1

7.13 Grams of methyltriethoxysilane, 14.42 g of phenyltriethoxysilane and 4.61 g of ethanol were weighed and stirred in the air at room temperature for about 5 minutes to prepare a homogeneous solution. The molar ratio of phenyltriethoxysilane/methyltriethoxysilane was 60/40. To the homogeneous solution, 7.21 g of 0.1-wt % diluted hydrochloric acid was added slowly, and the resulting solution was further stirred in the air at room temperature for another one hour, thereby co-hydrolyzing methyltriethoxysilane and phenyltriethoxysilane. The obtained solution containing a polymer obtained by co-hydrolyzing and poly-condensing methyltriethoxysilane and phenyltriethoxysilane was named as a coating solution 1.

This coating solution 1 was coated on a 10-cm-square soda lime silicate glass substrate (coefficient of linear expansion: $1.0 \times 10^{-5}/°C$.) to a thickness of 1.1 mm by spin coating to form an organic-inorganic composite thick film having a methyl group and a phenyl group. After evaporation of the solvent, this coated substrate was left to stand under reduced pressure in a vacuum press for about 1 hour. Thereafter, a 1-mm-thick quartz glass die with a releasing film on which hemispherical depressions having a depth of 30 µm and a radius of curvature of 30 µm were arranged at a pitch of 80 µm in a square area was joined to the inorganic-organic composite thick film comprising the polymer obtained by co-hydrolyzing and polycondensing methyltriethoxysilane and phenyltriethoxysilane on the glass substrate under a reduced pressure of $10^{-2}$ Torr and was pressed against the film at a pressure of 30 kg/cm$^2$. Then, with the glass substrate/inorganic-organic composite thick film/glass resin die joined together and pressurized, these were heat-treated at a relative humidity of 15% and 80° C. for 10 hours, and the quartz glass die was then removed.

By the above heat treatment, the inorganic-organic composite thick film comprising the polymer obtained by co-hydrolyzing and polycondensing methyltriethoxysilane and phenyltriethoxysilane was cured and turned into a transparent amorphous thick film covering the glass substrate. The thinnest portion of the film had a thickness of about 50 µm, the largest film thickness from the apex of a hemisphere was 80 µm, and lens patterns were arranged precisely on the surface of the film. Further, the deterioration of the transferred pattern and the cracking or peeling of the film due to the shrinkage of the film were not observed. When the optical properties of the obtained transparent amorphous thick film were evaluated by using a spectrophotometer, it was found that the film was completely transparent within the visible range and had a refractive index of 1.54. Further, when the microhardness of the film was measured by the microhardness meter of SHIMADZU CORPORATION, it was found to be 21. No depression was made ever when a finger nail was pressed hard against the surface of the film.

EXAMPLE 2

Liquid preparation and film formation were carried out in the same manner as in Example 1. After the coated substrate was left to stand under reduced pressure in a vacuum press for about 1 hour, a striped stamper having a plurality of V-shaped straight grooves (width of groove: 27 µm, depth of groove: 20 µm, section of groove: triangle, pitch between adjacent grooves (measured the distance between the centers of adjacent grooves): about 27 µm) on the surface was Joined to the inorganic-organic composite thick film comprising the polymer obtained by co-hydrolyzing and poly-condensing methyltriethoxysilane and phenyltriethoxysilane on the glass substrate under a reduced pressure of $10^{-2}$ Torr and was pressed against the film at a pressure of 30 kg/cm$^2$. Then, with the glass substrate/inorganic-organic composite thick film/glass resin die joined together and pressurized, these were heat-treated at a relative humidity of 15% and 80° C. for 10 hours, and the quartz glass die was then removed.

By the above heat treatment, the inorganic-organic composite thick film comprising the polymer obtained by co-hydrolyzing and polycondensing methyltriethoxysilane and phenyltriethoxysilane was cured and turned into a transparent amorphous thick film covering the glass substrate. Stripe patterns were arranged precisely on the surface of the film. Further, the deterioration of the transferred pattern and the cracking or peeling of the film due to the shrinkage of the film were not observed. When the optical properties of the obtained transparent amorphous thick film were evaluated by using a spectrophotometer, it was found that the film was completely transparent within the visible range and had a refractive index of 1.54. Further, when the microhardness of the film was measured by the microhardness meter of SHIMADZU CORPORATION, it was found to be 21. No depression was made ever when a finger nail was pressed hard against the surface of the film.

EXAMPLE 3

Liquid preparation, film formation, pressing, heat treatment and removal of a die were carried out to obtain a transparent amorphous thick film coated on a glass substrate in the same manner as in Example 1 except that the amount of methyltriethoxysilane was changed from 7.13 g to 0.89 g and the amount of phenyltriethoxysilane was changed from 14.42 g to 22.83 g. Lens patterns were arranged precisely on the surface of the film. Further, the deterioration of the transferred pattern and the cracking or peeling of the film due to the shrinkage of the film were not observed. When the optical properties of the obtained transparent amorphous thick film were evaluated by using a spectrophotometer, it was found that the film was completely transparent within the visible range and had a refractive index of 1.58. Further, when the microhardness of the film was measured by the microhardness meter of SHIMADZU CORPORATION, it was found to be 21. No depression was made ever when a finger nail was pressed hard against the surface of the film.

COMPARATIVE EXAMPLE 1

11.1 Grams of dimethyldiethoxysilane, 12.02 g of phenyltriethoxysilane and 5.8 g of ethanol were weighed and stirred in the air at room temperature to prepare a homogeneous solution. The molar ratio of phenyltriethoxysilane/dimethyldiethoxysilane was 40/60. To the homogeneous solution, 15.8 g of 0.1-wt % formic acid was added slowly, and the resulting solution was further stirred in the air at room temperature for another two hours, thereby co-hydrolyzing dimethyldiethoxysilane and phenyltriethoxysilane. The resulting solution was further heated in an oven at 80° C. for 12 hours, and the obtained solution containing a polymer obtained by co-hydrolyzing and polycondensing dimethyldiethoxysilane and phenyltriethoxysilane was used as a coating solution.

When this solution was formed into a film, cured and then pressed in the same manner as in Example 1, the inorganic-organic composite thick film comprising the polymer obtained by co-hydrolyzing and polycondensing dimethyldiethoxysilane and phenyltriethoxysilane was cured and turned into a transparent amorphous thick film. Lens patterns were arranged precisely on the surface of the thick film. However, when the microhardness of the obtained transparent amorphous thick film was measured by the microhardness meter of SHIMADZU CORPORATION, it was found to be 3. Shallow depression was made when a finger nail was pressed hard against the surface of the film.

As described above, the article with a predetermined surface pattern of the present invention, for example, a substrate with fine projections and depressions, is a substrate with fine projections and depressions which is obtained by forming a thick film composed of a silicon-based inorganic-organic composite material on a substrate and/or a die having a pattern of fine projections and depressions on the surface, joining the substrate and the die together, heating them to cure the silicon-based inorganic-organic composite material and then releasing the die. The fine projections and depressions of the substrate are an inversed pattern of the fine projections and depressions on the die. By alleviating the shrinkage and film stress caused by calcination, the complete transfer of a die pattern, patterning of a thick film having a depth to the order of several tens of micrometers and an improvement in microhardness have been achieved.

What is claimed is:

1. A method for producing an article having a predetermined surface pattern, which comprises the steps of disposing closely a sol-gel material between a patterning die and a substrate in the form of a film and heating them to coat the surface of the substrate with a gel film having a surface pattern which is the inverse of the surface pattern of the patterning die, wherein the sol-gel material comprises:

(A) at least one compound selected from the group consisting of the silane compound represented by the following formula (1), the hydrolysate of the silane compound, and the polycondensate of the hydrolysate:

$$R^1SiX_3 \tag{1}$$

wherein $R^1$ is an alkyl group or a hydrogen atom, and X is an alkoxyl group or a halogen atom, and (B) at least one compound selected from the group consisting of the silane compound represented by the following formula (2), the hydrolysate of the silane compound, and the polycondensate of the hydrolysate:

$$R^2SiY_3 \tag{2}$$

wherein $R^2$ is an aryl group or a substituted aryl group, and Y is an alkoxyl group or a halogen atom, wherein the sol-gel material comprises 5 to 50 mol % of the component (A) and 50 to 95 mol % of the component (B) based on the total of the components (A) and (B).

2. The method of claim 1, wherein the sol-gel material comprises 20 to 40 mol % of the component (A) and 60 to 80 mol % of the component (B) based on the total of the components (A) and (B).

3. The method of claim 1, wherein the $R^1$ in the formula (1) is a methyl group, an ethyl group or hydrogen atom, and the $R^2$ in the formula (2) is a phenyl group or a benzyl group.

4. The method of claim 1, wherein the component (A) is methyltriethoxysilane and the component (B) is phenyltriethoxysilane or substituted phenyltriethoxysilane.

5. An article with a predetermined surface pattern which comprises a substrate and an organopolysiloxane film formed on the surface of the substrate, wherein the organopolysiloxane film consists essentially of the alkylsiloxane or hydrogensiloxane represented by the following formula (3):

$$R^3SiO_{3/2} \tag{3}$$

wherein $R^3$ is an alkyl group or a hydrogen atom, and the arylsiloxane or substituted arylsiloxane represented by the following formula (4):

$$R^4SiO_{3/2} \tag{4}$$

wherein $R^4$ is an aryl group or a substituted aryl group.

6. The article of claim 5, wherein $R^3$ in the formula (3) is a methyl group, an ethyl group or a hydrogen atom, and the $R^4$ in the formula (4) is a phenyl group or a benzyl group.

7. The article of claim 5, wherein the organopolysiloxane film has a thickness of 0.5 to 200 μm and comprises 5 to 50 mol % of the alkylsiloxane or hydrogensiloxane and 50 to 95 mol % of the arylsiloxane or substituted arylsiloxane (with the proviso that the mol % is based on the total of the two components).

8. A film-forming mixed composition for producing an article having a predetermined surface pattern, which comprises:

(A) 1 mole of at least one compound selected from the group consisting of the silane compound represented by the following formula (5), the hydrolysate of the silane compound, and the polycondensate of the hydrolysate:

$$R^1SiX_3 \tag{5}$$

wherein $R^1$ is an alkyl group or a hydrogen atom, and X is an alkoxyl group or halogen atom, (B) 1.0 to 19 moles of at least one compound selected from the group consisting of the silane compound represented by the following formula (6), the hydrolysate of the silane compound, and the polycondensate of the hydrolysate:

$$R^2SiY_3 \tag{6}$$

wherein $R^2$ is an aryl group or a substituted aryl group, and Y is an alkoxyl group or a halogen atom, (C) an alcohol in an amount of 0.3 to 3 times as many moles as the total of the components (A) and (B), (D) an acid catalyst in an amount of 0.00001 to 0.1 times as many moles as the total of the components (A) and (B), and (E) water in an amount of 2 to 20 times as many moles as the total of the components (A) and (B).

9. The method of claim 2, wherein the $R^1$ in the formula (1) is a methyl group, an ethyl group or a hydrogen atom, and the $R^2$ in the formula (2) is a phenyl group or a benzyl group.

10. The method of claim 2, wherein the component (A) is methyltriethoxysilane and the component (B) is phenyltriethoxysilane or substituted phenyltriethoxysilane.

11. The method of claim 3, wherein the component (A) is methyltriethoxysilane and the component (B) is phenyltriethoxysilane or substituted phenyltriethoxysilane.

12. The article of claim 6, wherein the organopolysiloxane film has a thickness of 0.5 to 200 μm and comprises 5 to 50 mol % of the alkylsiloxane or hydrogensiloxane and 50 to 95 mol % of the arylsiloxane or substituted arylsiloxane (with the proviso that the mol % is based on the total of the two components).

* * * * *